US011955711B2

(12) United States Patent
Ilvonen et al.

(10) Patent No.: US 11,955,711 B2
(45) Date of Patent: Apr. 9, 2024

(54) REDIRECTING STRUCTURE FOR ELECTROMAGNETIC WAVES

(71) Applicants: HUAWEI TECHNOLOGIES CO., LTD., Guangdong (CN); Janne Ilvonen, Helsinki (FI)

(72) Inventors: Janne Ilvonen, Helsinki (FI); Alexander Khripkov, Helsinki (FI); Jari Kristian Van Wonterghem, Kista (SE); Ruiyuan Tian, Helsinki (FI)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 278 days.

(21) Appl. No.: 17/438,015

(22) PCT Filed: Mar. 14, 2019

(86) PCT No.: PCT/EP2019/056400
§ 371 (c)(1),
(2) Date: Sep. 10, 2021

(87) PCT Pub. No.: WO2020/182311
PCT Pub. Date: Sep. 17, 2020

(65) Prior Publication Data

US 2022/0149531 A1 May 12, 2022

(51) Int. Cl.
*H01Q 1/24* (2006.01)
*H01Q 13/06* (2006.01)
*H01Q 19/10* (2006.01)

(52) U.S. Cl.
CPC ............ *H01Q 13/06* (2013.01); *H01Q 19/10* (2013.01); *H01Q 1/243* (2013.01)

(58) Field of Classification Search
CPC .......... H01Q 1/24; H01Q 1/243; H01Q 19/10; H01Q 15/14; H01Q 13/06; H01Q 1/52; H01P 1/04; H01P 5/19
See application file for complete search history.

(56) References Cited

U.S. PATENT DOCUMENTS 9,147,941 B2 9/2015 Zhang
9,160,069 B2 10/2015 Zhang
(Continued)

FOREIGN PATENT DOCUMENTS

CN 101103491 A 1/2008
CN 101561699 A 10/2009
(Continued)

*Primary Examiner* — Thai Pham
(74) *Attorney, Agent, or Firm* — WOMBLE BOND DICKINSON (US) LLP

(57) ABSTRACT

A redirecting structure for electromagnetic waves, the redirecting structure comprising a first reflection passage formed between a first conductive element and a second conductive element, and an antenna structure comprising an antenna element and a radiation passage extending from the antenna element in a first direction. The antenna structure is connected to the first reflection passage at a first interface, the first reflection passage extending in a second direction different from the first direction. A first reflective structure is associated with an interior of the first reflection passage and is arranged at a predetermined distance from the first interface such that electromagnetic waves propagating from the antenna structure into the first reflection passage are reflected to the radiation passage by the first reflective structure.

20 Claims, 5 Drawing Sheets

(56) References Cited

U.S. PATENT DOCUMENTS

| | | | | |
|---|---|---|---|---|
| 9,972,892 | B2 | 5/2018 | Noori et al. | |
| 2011/0181373 | A1* | 7/2011 | Kildal | H01P 1/2005 333/239 |
| 2014/0225785 | A1* | 8/2014 | Yu | H01Q 13/02 343/702 |
| 2017/0085007 | A1* | 3/2017 | Wu | H01Q 1/521 |
| 2018/0090851 | A1 | 3/2018 | Feldman et al. | |
| 2018/0351261 | A1* | 12/2018 | Kamo | H01Q 21/064 |
| 2019/0074569 | A1* | 3/2019 | Kamo | H01P 5/222 |
| 2020/0044360 | A1* | 2/2020 | Kamo | G01S 7/03 |

FOREIGN PATENT DOCUMENTS

| | | | |
|---|---|---|---|
| CN | 101667681 | A | 3/2010 |
| CN | 102315517 | A | 1/2012 |
| CN | 104010479 | A | 8/2014 |
| CN | 104064844 | A | 9/2014 |
| CN | 105122543 | A | 12/2015 |
| CN | 206602167 | U | 10/2017 |
| CN | 107404000 | A | 11/2017 |
| CN | 206758622 | U | 12/2017 |
| CN | 107546452 | A | 1/2018 |
| CN | 108736164 | A | 11/2018 |
| CN | 108736166 | A | 11/2018 |
| CN | 108987866 | A | 12/2018 |
| CN | 109119732 | A | 1/2019 |
| CN | 208782007 | U | 4/2019 |
| JP | 2001313520 | A | 11/2001 |
| JP | 2005159767 | A | 6/2005 |
| JP | 2014045366 | A | 3/2014 |
| WO | 2007069367 | A1 | 6/2007 |
| WO | 2010050122 | A1 | 5/2010 |
| WO | 2018190343 | A1 | 10/2018 |

* cited by examiner

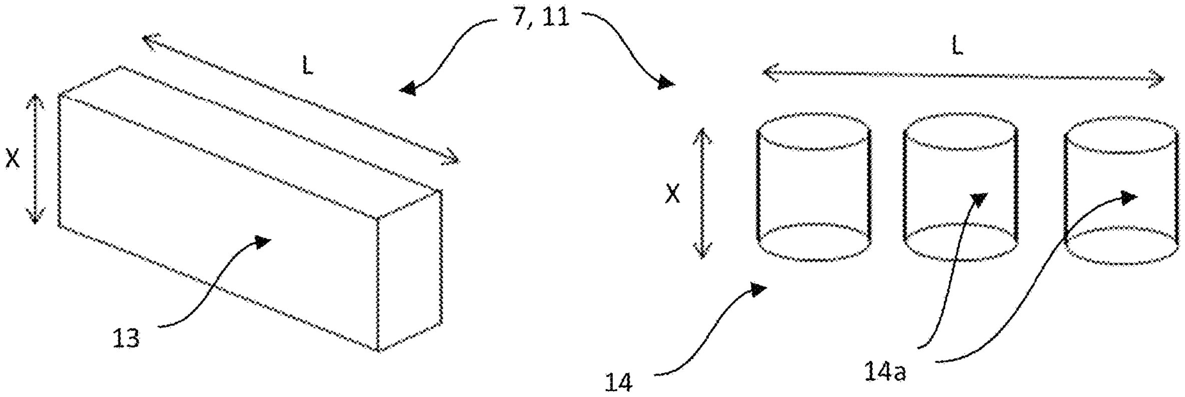
Fig. 6a
Fig. 6b
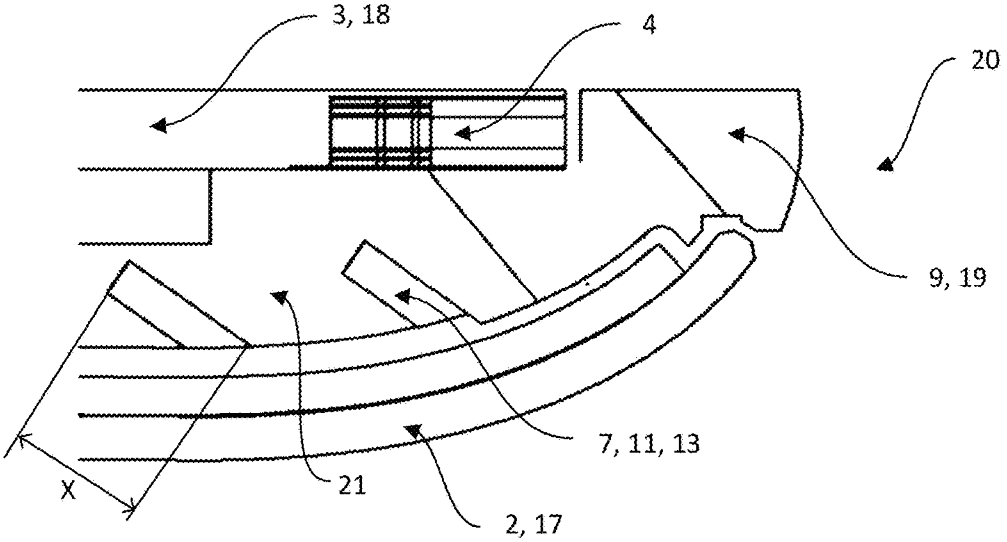
Fig. 7a
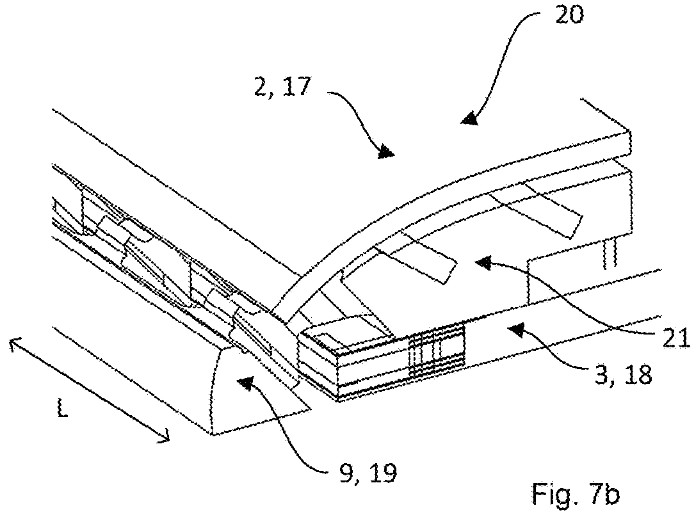
Fig. 7b

REDIRECTING STRUCTURE FOR ELECTROMAGNETIC WAVES

CROSS-REFERENCE TO RELATED APPLICATIONS

This application is a National Stage of International Patent Application No. PCT/EP2019/056400, filed on Mar. 14, 2019, which is hereby incorporated by reference in its entirety.

TECHNICAL FIELD

The disclosure relates to a redirecting structure for electromagnetic waves, the redirecting structure comprising at least one antenna structure comprising at least one antenna element.

BACKGROUND

Electronic devices need to support more and more radio signal technology such as 2G/3G/4G radio. For coming 5G radio technology, the frequency range will be expanded from sub-6 GHz to so called millimeter-wave (mmWave) frequency, e.g. above 20 GHz. For mmWave frequencies, an antenna array will be necessary in order to form a radiation beam with higher gain which overcomes the higher path loss in the propagation media. However, radiation beam patterns with higher gain result in a narrow beam width, wherefore beam steering techniques such as the phased antenna array is used to steer the beam in a specific, desired direction.

Mobile electronic devices, such as mobile phones and tablets, may be oriented in any arbitrary direction. Therefore, such electronic devices need to exhibit an as near full spherical beam coverage as possible. Such coverage is difficult to achieve, i.e. due to the radiation beam being blocked by a conductive housing, a large display, and/or by the hand of the user holding the device.

Conventionally, a mmWave antenna array is arranged next to the display, such that the display does not interfere with the beam coverage. However, the movement towards very large displays, covering as much as possible of the electronic device, makes the space available for the antenna array very limited, forcing either the size of the antenna array to be significantly reduced, and its performance impaired, or a large part of the display to be inactive.

SUMMARY

It is an object to provide an improved electromagnetic wave redirecting structure. The foregoing and other objects are achieved by the features of the independent claims. Further implementation forms are apparent from the dependent claims, the description, and the figures.

According to a first aspect, there is provided a redirecting structure for electromagnetic waves having a wavelength, the redirecting structure comprising a first reflection passage formed between a first conductive surface of a first conductive element and a first conductive surface of a second conductive element, at least one antenna structure comprising at least one antenna element and at least one radiation passage extending from the antenna element in a first direction, the antenna element being configured to emit electromagnetic waves, the electromagnetic waves propagating at least partially through the radiation passage, the antenna structure being connected to the first reflection passage at a first interface, the first reflection passage extending in a second direction, the second direction being different from the first direction, a first reflective structure associated with an interior of the first reflection passage, the first reflective structure being arranged at a predetermined distance from the first interface such that electromagnetic waves propagating from the antenna structure into the first reflection passage are reflected to the radiation passage by the first reflective structure, the first reflective structure extending in parallel with a longitudinal extension of the antenna element.

Such a solution facilitates an arrangement which prevents destructive radiation from propagating through passages existing between the conductive elements of a device, such as between the display and the frame of a mobile phone. Propagation of radiation through such passages, i.e. radiation leakage, at mmWave frequencies causes undesired degradation to the radiation pattern as well as power loss. Furthermore, the solution eliminates the need for galvanic grounding of conductive elements, such as the display, reducing the risk of hotspots in the display and heat transfer related issues. In addition, galvanic grounding may be unreliable and its location may be critical for the antenna structure itself. The present solution redirects radiation such that the antenna directivity will be maximized towards desired direction(s). The reflective surface of the redirecting structure prevents e.g. mmWave signals from propagating between the conductive elements, and is suitable for many types of antennas, not only mmWave antennas.

In an embodiment of the first aspect, the redirecting structure further comprises a second reflection passage formed between a second conductive surface of the second conductive element and a first conductive surface of a third conductive element, the second reflection passage extending in a third direction, the third direction being different from the first direction and the second direction, the antenna structure comprising a second interface connecting the radiation passage to the second reflection passage. This facilitates an arrangement which prevents destructive radiation fields to propagate through multiple passages existing between the conductive elements of a device.

In an embodiment of the first aspect, the redirecting structure further comprises a second reflective structure associated with an interior of the second reflection passage, the second reflective structure being arranged at the predetermined distance from the second interface such that electromagnetic waves propagating from the antenna structure into the second reflection passage are reflected to the radiation passage by the second reflective structure, the second reflective structure extending in parallel with a longitudinal extension of the antenna element. This prevents signals from propagating in several undesired directions, between different surfaces of the conductive elements.

In an embodiment of the first aspect, the electromagnetic waves propagate in the first direction within the radiation passage, the electromagnetic waves propagate in the second direction within the first reflection passage, and/or the electromagnetic waves propagate in the third direction within the second reflection passage.

In an embodiment of the first aspect, the radiation passage extends from the antenna element in a direction towards the first conductive element, facilitating highly directional radiation.

In an embodiment of the first aspect, the radiation passage extends from the antenna element between a second conductive surface of the first conductive element and a second conductive surface of the second conductive element or between the second conductive surface of the first conductive element and the first conductive surface of the third conductive element, facilitating passages for the redirected radiation without having to provide additional components.

In an embodiment of the first aspect, the radiation passage extends from the antenna element and partially between the first conductive surface of the first conductive element and the first conductive surface of the second conductive element.

In an embodiment of the first aspect, the first reflective structure and the second reflective structure are configured to optimize the amount of electromagnetic waves propagating in the first direction, by reflecting electromagnetic waves from at least one of the first reflection passage and the second reflection passage to the radiation passage, reducing the amount of electromagnetic waves propagating in the second direction and the third direction.

In an embodiment of the first aspect, the first reflective structure is arranged at the first conductive surface of the second conductive element and/or the second reflective structure is arranged at the second conductive surface of the second conductive element or the first surface of the third conductive element, allowing a wide variety of options for placement of the reflective structure(s).

In an embodiment of the first aspect, at least one of the first reflective structure and the second reflective structure comprises an artificial reflective electromagnetic surface.

In an embodiment of the first aspect, at least one of the first reflective structure and the second reflective structure has a longitudinal extension being of the same length as, or longer than, the longitudinal extension of the antenna element, such that all radiation transmitted by the antenna element can be redirected.

In an embodiment of the first aspect, at least one of the first reflective structure and the second reflective structure has a transverse extension being of a height equal to the predetermined distance, providing highly efficient reflection.

In an embodiment of the first aspect, at least one of the first reflective structure and the second reflective structure comprises at least one groove or at least one row of protrusions extending from the first conductive surface of the second conductive element, the second conductive surface of the second conductive element, or the first conductive surface of the third conductive element, each groove extending into a body of the second conductive element or the third conductive element, each protrusion extending into the interior of the first reflection passage or the interior of the second reflection passage, a longitudinal extension of the groove or row of protrusions corresponding to the longitudinal extension of the antenna element. This solution facilitates providing reflective structures without affecting the internal dimensions of the device in which the redirecting structure is formed.

In an embodiment of the first aspect, the groove extends at an angle >0° to the first conductive surface of the second conductive element, to the second conductive surface of the second conductive element, or to the first conductive surface of the third conductive element, allowing the groove to be arranged in a mode suitable for frequencies and surrounding dimensions.

In an embodiment of the first aspect, the groove comprises one of a continuous recess and a plurality of individual cavities, the individual cavities being arranged in sequence in the direction of the longitudinal extension of the groove.

In an embodiment of the first aspect, the row of protrusions comprises at least one protrusion, and each protrusion extends at a 90° angle to the first conductive surface of the second conductive element, to the second conductive surface of the second conductive element, or to the first conductive surface of the third conductive element, the protrusions of a row of protrusions being arranged in sequence in the direction of the longitudinal extension of the row of protrusions.

In an embodiment of the first aspect, at least one of the first reflective structure and the second reflective structure comprises a first reflective set, the first reflective set comprising at least one groove or at least one row of protrusions, a longitudinal extension of the first reflective set being parallel with the longitudinal extension of the antenna element, facilitating redirection of radiation from an antenna element having a particular width.

In an embodiment of the first aspect, the redirecting structure comprises a first antenna structure and a second antenna structure, the antenna element of the second antenna structure having a longitudinal extension which is perpendicular to a longitudinal extension of the antenna element of the first antenna structure, wherein at least one of the first reflective structure and the second reflective structure comprises a second reflective set, the second reflective set comprising at least one groove or at least one row of protrusions, a longitudinal extension of the second reflective set being perpendicular to the longitudinal extension of the first reflective set, the groove or the row of protrusions of the first reflective set intersecting the groove or the row of protrusions of the second reflective set, the first reflective set extending in parallel with the longitudinal extension of the first antenna structure, the second reflective set extending in parallel with the longitudinal extension of the second antenna structure. The matrix shaped arrangement of grooves and/or rows of protrusions is preferable when the antenna aperture is not properly defined.

In an embodiment of the first aspect, at least one of the first reflective structure and the second reflective structure comprises at least one dielectric material.

In an embodiment of the first aspect, at least one of the first reflective structure and the second reflective structure comprises a plurality of grooves or a plurality of rows of protrusions, each groove or protrusion of the first reflective structure and the second reflective structure having the same transverse extension, at least two of the grooves and the protrusions comprising dielectric materials having different dielectric properties, allowing variable electrical lengths for the reflective structures, thus enabling multiband or wideband operation.

In an embodiment of the first aspect, at least one of the first reflective structure and the second reflective structure comprises a plurality of grooves or a plurality of rows of protrusions, each groove or row of protrusions comprising the same dielectric material, at least two of the grooves and the rows of protrusions having different transverse extensions, making it possible to obtain much wider operational bandwidth for the reflective structure and which solution is tolerant to gap variances between conductive elements.

In an embodiment of the first aspect, at least one of the first reflection passage and the second reflection passage is filled with one of air, vacuum, and a foam material.

In an embodiment of the first aspect, the predetermined distance is quarter wavelength ±25%, which can reduce the amount of leaked radiation significantly.

According to a second aspect, there is provided an electronic device comprising the redirecting structure according to the above, the electronic device comprising a display and a frame, the frame comprising a main frame section, extending essentially in parallel with the display, and a peripheral frame section at least partially surrounding a peripheral edge of the display, at least one antenna structure extending at least between the display and the peripheral frame section.

In such an electronic device, destructive radiation fields are prevented from propagating through passages existing between e.g. the display and the frame. This, in turn, prevents undesired degradation of the radiation pattern and power loss. Furthermore, the risk of hotspots in the display and heat transfer related issues are reduced. The electronic device can comprise many types of antennas, not only mmWave antennas.

In an embodiment of the second aspect, the display is a first conductive element, the main frame section is a second conductive element, and a first reflection passage extends between the display and the main frame section, facilitating redirection of unwanted radiation without having to provide additional components.

In an embodiment of the second aspect, the main frame section and the peripheral frame section are separated by means of at least one of a second reflection passage and the radiation passage of the antenna structure, allowing radiation to propagate to the exterior without affecting the appearance of the electronic device.

In an embodiment of the second aspect, the peripheral frame section is a third conductive element surrounding the periphery of the display and the main frame section, the second reflection passage extending between the main frame section and the peripheral frame section, allowing radiation to propagate towards the display side of the electronic device.

In an embodiment of the second aspect, the main frame section is a first conductive element, the peripheral frame section is a second conductive element, and a first reflection passage extends between the main frame section and the peripheral frame section, the main frame section and the peripheral frame section being separated by means of the first reflection passage and the radiation passage of the antenna structure.

In an embodiment of the second aspect, a first reflective structure is arranged at a first conductive surface of the main frame section and optionally a second reflective structure is arranged at a second conductive surface of the main frame section, preventing destructive radiation fields to propagate through multiple passages existing between the conductive elements of the electronic device.

In an embodiment of the second aspect, the electronic device comprises a mechanical structure arranged at least partially between the main frame section and the display, at least one of a first reflective structure and a second reflective structure being arranged on the mechanical structure, facilitating suitable placement of the reflective structures near, of far from, remaining conductive elements.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIGS. 6*a* and 6*b* show schematic perspective views of reflective structures comprised within redirecting structures in accordance with embodiments of the present disclosure;

FIG. 7*a* shows a schematic cross-sectional view of a redirecting structure mounted in an electronic device in accordance with one embodiment of the present disclosure;

FIG. 7*b* shows a partial perspective view of a redirecting structure mounted in an electronic device in accordance with one embodiment of the present disclosure;

DETAILED DESCRIPTION

Figure 1A:
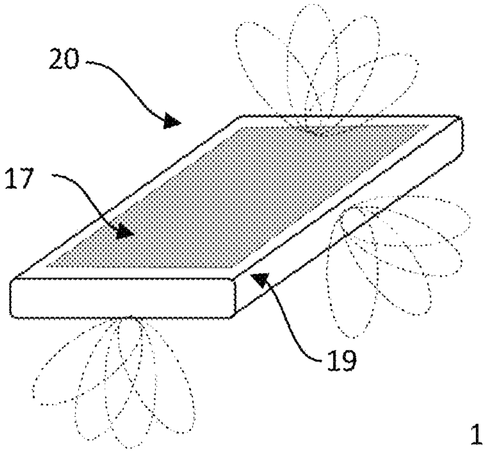
FIG. 1*a* shows a schematic perspective view of an electronic device in accordance with an embodiment of the present disclosure.
Figure 1B:
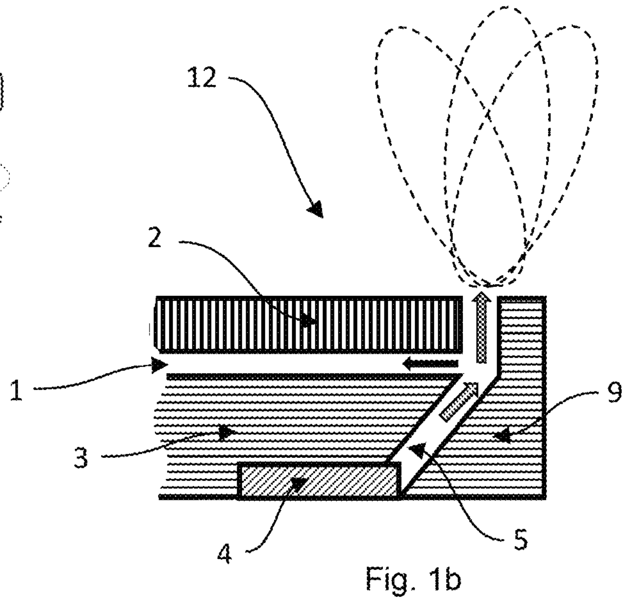
FIG. 1*b* shows a schematic cross-sectional view of a redirecting structure mounted in an electronic device in accordance with one embodiment of the present disclosure.

FIG. 1*a* shows, very schematically, an electronic device 20 such as a mobile phone or a tablet. The electronic device 20 comprises a redirecting structure 12 for redirection of electromagnetic waves having a wavelength λ, shown schematically in FIG. 1*b* and comprising at least one antenna structure. The electronic device 20 furthermore comprises a display 17 and a frame. As shown in FIGS. 7*a* and 7*b*, the frame comprises a main frame section 18, extending essentially in parallel with the display 17, and a peripheral frame section 19 at least partially surrounding a peripheral edge of the display 17. The main frame section 18 may be e.g. a chassis or a printed circuit board (PCB), and the peripheral frame section 19 may a metal housing. The frame, i.e. main frame section 18 and peripheral frame section 19, may be one integral component, or may be at least two separate components. At least one antenna structure extends between the display 17 and the peripheral frame section 19. The electronic device 20 may further comprise a mechanical structure 21, e.g. a camera, speaker, or sensor, arranged at least partially between the main frame section 18 and the display 17, and at least a part of the redirecting structure 12 may be arranged on the mechanical structure 21.

Figure 2:
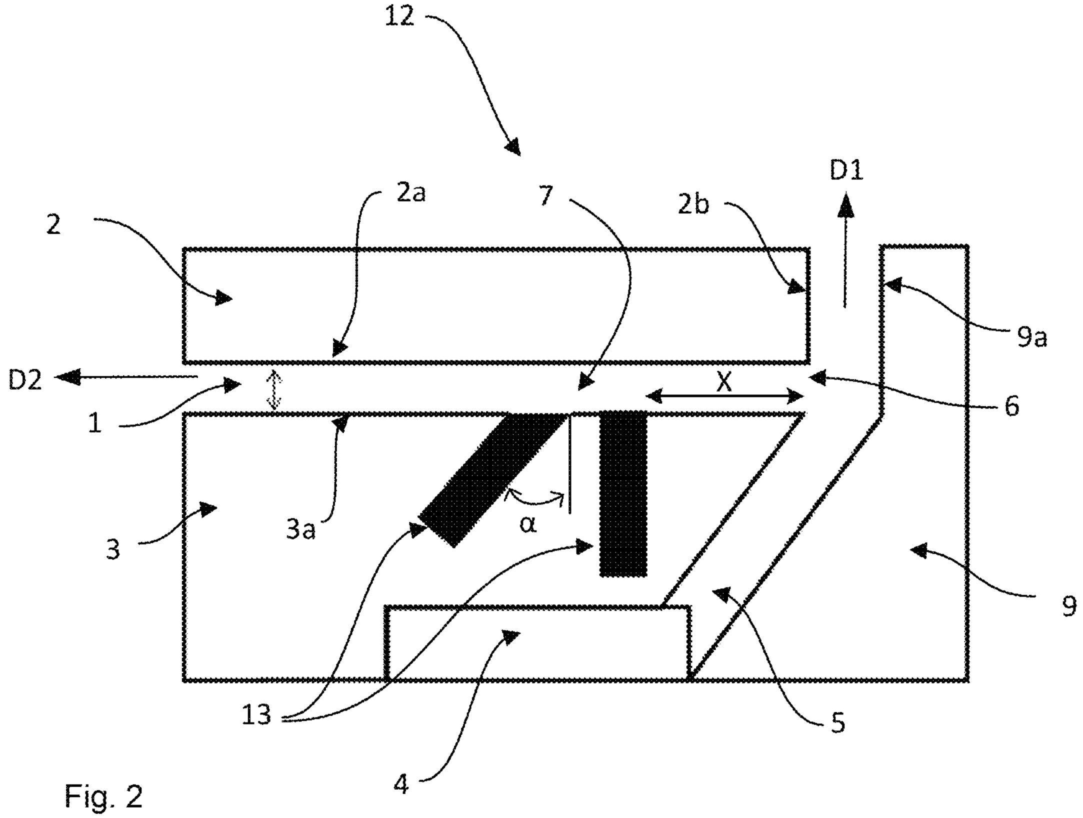
FIG. 2 shows a schematic cross-sectional view of a redirecting structure in accordance with one embodiment of the present disclosure.

One embodiment of the redirecting structure 12 is shown schematically in FIG. 2. The redirecting structure comprises at least a first reflection passage 1 formed between a first conductive surface 2*a* of a first conductive element 2 and a first conductive surface 3*a* of a second conductive element 3. The first conductive element 2 may be the display 17, and the second conductive element 3 may be the main frame section 18, in which embodiment the first reflection passage 1 extends between the display 17 and the main frame section 18.

The redirecting structure 12 further comprises at least one antenna structure comprising at least one antenna element 4 and at least one radiation passage 5 extending from the antenna element 4 in a first direction D1, which may be a direction towards the first conductive element 2. Antenna element 4 is configured to emit electromagnetic waves, which electromagnetic waves propagate at least partially through the radiation passage 5. The description below refers to an antenna structure comprising a single antenna element 4, for ease of reading, however the antenna structure preferably comprises multiple antenna elements 4.

The antenna structure is connected to the first reflection passage 1 at a first interface 6. The first reflection passage 1 extends in a second direction D2 which is different from the first direction D1. The first reflection passage 1 and the radiation passage 5 may be arranged at any angle in relation to each other.

Figure 3A:
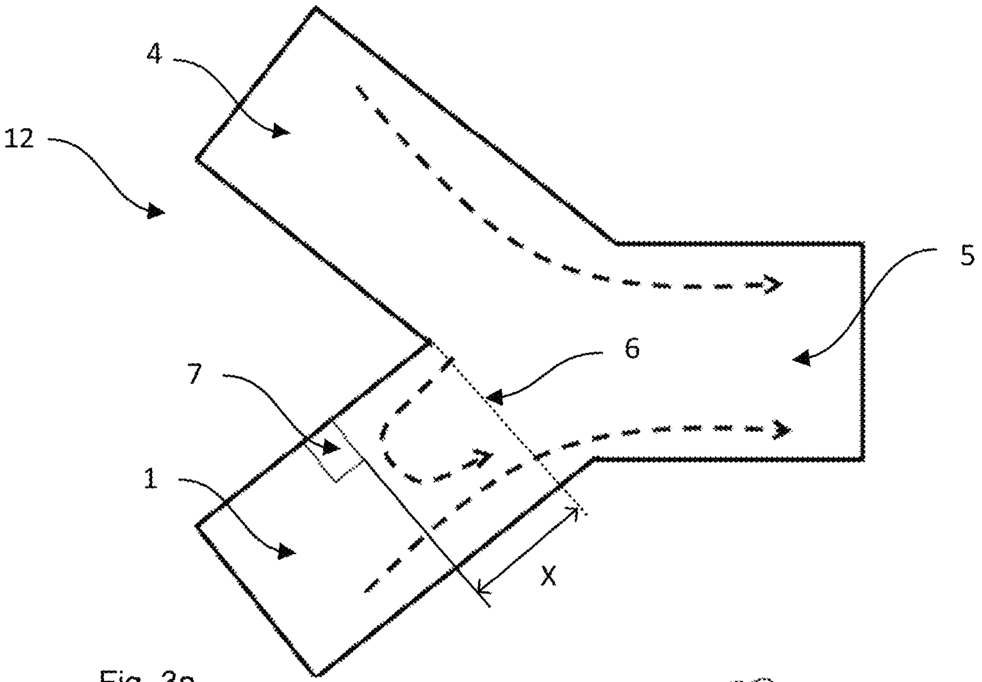
FIG. 3*a* shows a schematic cross-sectional view of the radiation paths within a redirecting structure in accordance with one embodiment of the present disclosure.

As shown schematically in FIG. 3*a*, and in more detail in FIG. 4*a*, the redirecting structure 12 further comprises a first reflective structure 7 associated with an interior of the first reflection passage 1, allowing, e.g., the radiation to be directed to the display side of the electronic device 20 by using a proper propagation channel, such as waveguide. The first reflective structure 7 is arranged at a predetermined distance X from the first interface 6, such that electromagnetic waves propagating from the antenna structure into the first reflection passage 1 are reflected to the radiation passage 5 by the first reflective structure 7. The first reflective structure 7 extends in parallel with a longitudinal extension of the antenna element 4. In one embodiment, the predetermined distance X is quarter wavelength $\lambda/4\pm25\%$, which can reduce the amount of leaked radiation by 40 dB from 26 to 42 GHz.

Figure 3B:
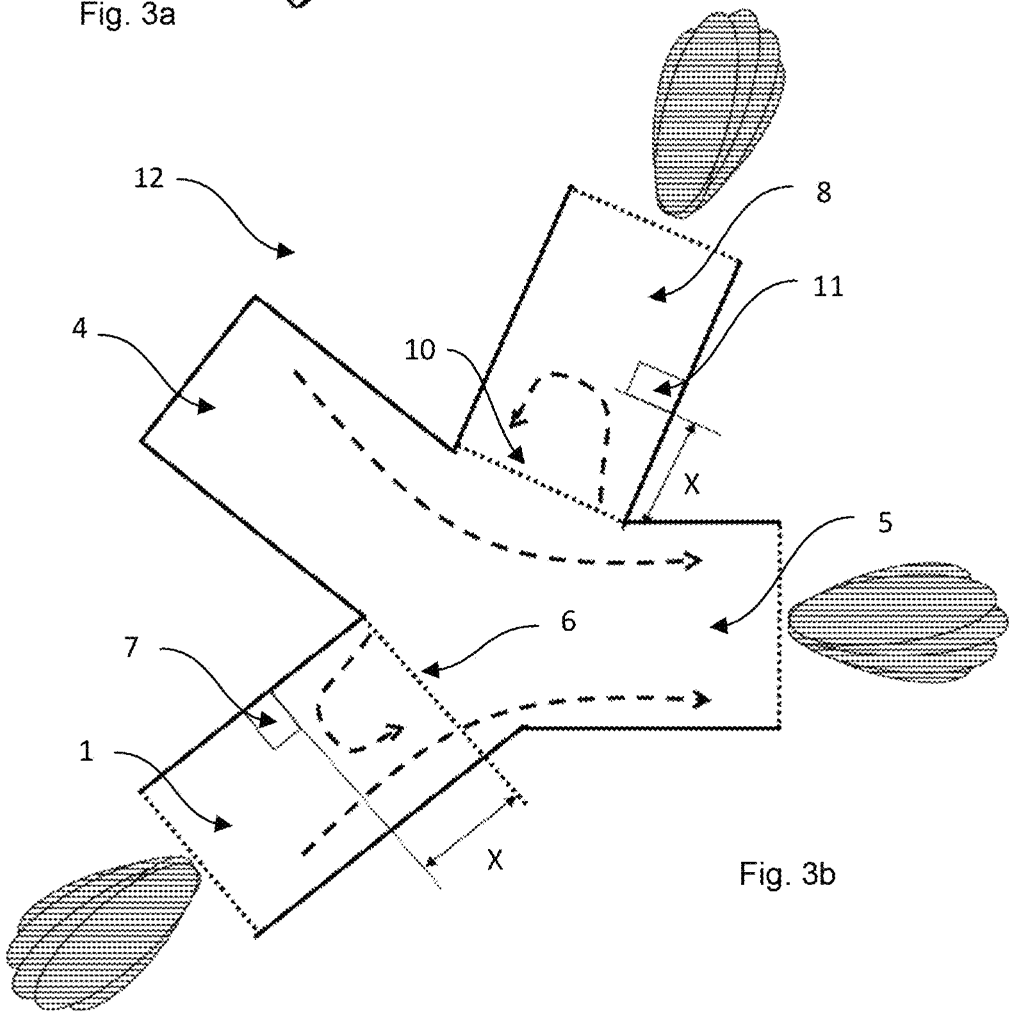
FIG. 3*b* shows a schematic cross-sectional view of the radiation paths within a redirecting structure in accordance with a further embodiment of the present disclosure.

As shown schematically in FIG. 3*b*, and in more detail in FIGS. 4*b* to 4*d*, the redirecting structure 12 may comprise a second reflection passage 8 formed between a second conductive surface 3*b* of the second conductive element 3 and a first conductive surface 9*a* of a third conductive element 9, in which embodiment the second reflection passage 8 extends in a third direction D3. This allows placing the first reflective structure 7 under the first conductive element 2, which in one embodiment is display 17, in such a way that radiation from a potential radiation leak inside the display 17 is reflected. The antenna element 4 is placed on the second conductive element 3, which in one embodiment is the main frame section 18, adjacent but separated from the first reflective structure 7.

The third direction D3 is different from the first direction D1 and the second direction D2. The first reflection passage 1, the radiation passage 5, and the second reflection passage 8 may be arranged at any angle in relation to each other. The antenna structure comprises a second interface 10 connecting the radiation passage 5 to the second reflection passage 8.

As shown schematically in FIG. 4*c*, the antenna element 4 may be placed just under the first conductive element 2/display 17. However, there may be a gap between antenna element 4 and the second conductive element 3/main frame section 18, and some radiation may leak in an unwanted direction. Hence, a further reflective structure 11 is preferably placed on a surface in the unwanted direction, e.g. the second conductive surface 3*b*. The first reflective structure 7 is placed on the second conductive element 3/main frame section 18 under the display, i.e. on the first conductive surface 3*a*.

As shown schematically in FIG. 4*d*, the antenna element 4 may be placed on the second conductive element 3/main frame section 18, preferably the second conductive surface 3*b*. Radiation may potentially leak from inside the first conductive element 2/display 17 or the back of the electronic device 20. The first reflective structure 7 is placed on the second conductive element 3/main frame section 18, under the first conductive element 2/display 17, and/or next to the third conductive element 9, which in one embodiment is peripheral frame section 19. With this kind of placement, unwanted radiation towards the back of the electronic device 20 can be minimized.

The first reflection passage 1 and the second reflection passage 8 may be filled with one of air, dielectric, and a foam material.

As mentioned above, the third conductive element 9 may be the peripheral frame section 19, which is arranged to surround the periphery of the display 17 and the main frame section 18, in which embodiment the second reflection passage 8 extends between the main frame section 18 and the peripheral frame section 19.

The redirecting structure 12 may comprise a second reflective structure 11 associated with an interior of the second reflection passage 8. The second reflective structure 11 is arranged at the predetermined distance X from the second interface 10, such that electromagnetic waves propagating from the antenna structure into the second reflection passage 8 are reflected to the radiation passage 5 by the second reflective structure 11. The second reflective structure 11 extends in parallel with a longitudinal extension of the antenna element 4.

At least one of the first reflective structure 7 and the second reflective structure 11 may be arranged on the mechanical structure 21.

The main frame section 18 and the peripheral frame section 19 may be separated by the second reflection passage 8, as shown in FIGS. 4*b* to 4*d*, by the radiation passage 5 of the antenna structure, as shown in FIG. 4*a*, or by both.

Figure 5:
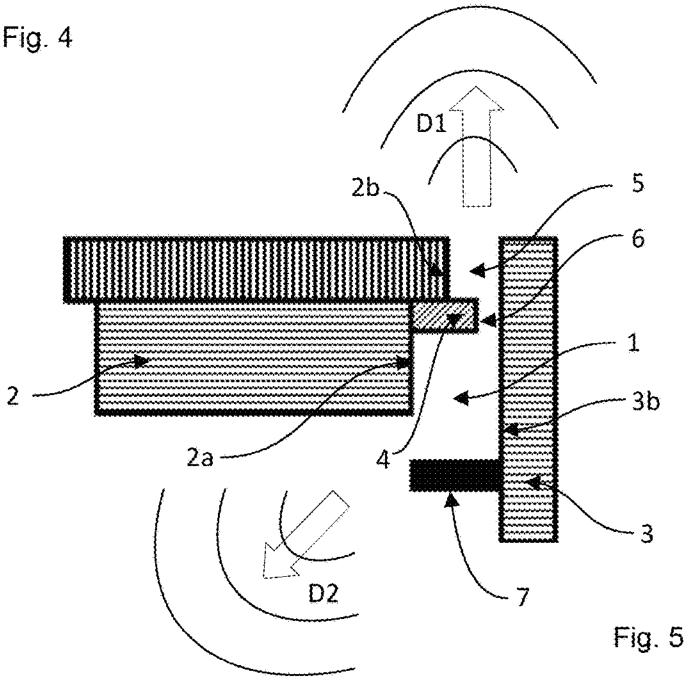
FIG. 5 shows a schematic cross-sectional view of a redirecting structure in accordance with a further embodiment of the present disclosure.

The first conductive element 2 may be the main frame section 18, and the second conductive element 3 may be the peripheral frame section 19, in which embodiment the first reflection passage 1 extends between the main frame section 18 and the peripheral frame section 19, as shown in FIG. 5. The main frame section 18 and the peripheral frame section 19 are separated by the first reflection passage 1 and by the radiation passage 5 of the antenna structure. The first reflective structure 7 may be arranged at the first conductive surface 2*a* of the main frame section 18 and, in an embodiment, the second reflective structure 11 may be arranged at a second conductive surface 2*b* of the main frame section 18.

Figure 4:
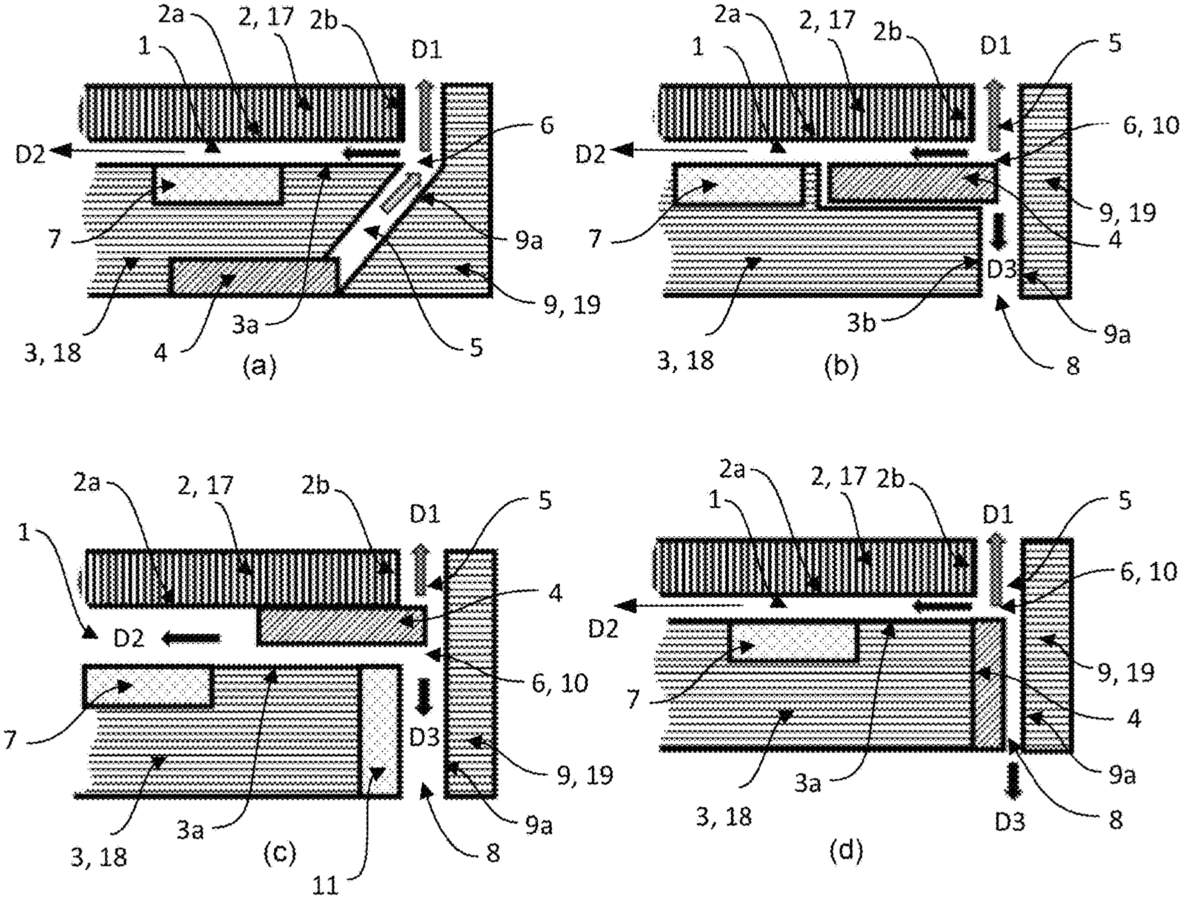
FIGS. 4*a*-4*d* show schematic cross-sectional views of redirecting structures in accordance with embodiments of the present disclosure, each illustration comprising a different embodiment.

As shown in FIGS. 3 to 5, the electromagnetic waves may propagate in the first direction D1 within the radiation passage 5, in the second direction D2 within the first reflection passage 1, and/or in the third direction D3 within the second reflection passage 8.

In one embodiment, shown in FIG. 5, the radiation passage 5 extends from the antenna element 4 between the second conductive surface 2*b* of the first conductive element 2 and the second conductive surface 3*b* of the second conductive element 3. In a further embodiment, the radiation passage 5 extends between the second conductive surface 2*b* of the first conductive element 2 and the first conductive surface 9*a* of the third conductive element 9, as shown in FIGS. 4*a* to 4*d*.

In one embodiment, the radiation passage 5 extends from the antenna element 4 and partially between the first conductive surface 2*a* of the first conductive element 2 and the first conductive surface 3*a* of the second conductive element 3.

The first reflective structure 7 and the second reflective structure 11 are configured to optimize the amount of electromagnetic waves propagating in the first direction D1 by reflecting electromagnetic waves from at least one of the first reflection passage 7 and the second reflection passage 8 to the radiation passage 5, reducing the amount of electromagnetic waves propagating in the second direction D2 and the third direction D3.

In one embodiment, the first reflective structure 7 is arranged at the first conductive surface 3*a* of the second conductive element 3, as shown in FIGS. 2, 4*a* to 4*d*, and 5.

The second reflective structure 11 may be arranged at the second conductive surface 3*b* of the second conductive element 3, as shown in FIG. 4*c*, or may be arranged at the first surface 9*a* of the third conductive element 9.

At least one of the first reflective structure 7 and the second reflective structure 11 comprise an artificial reflective electromagnetic surface, e.g. comprising metal. One, or both, of the first reflective structure 7 and the second reflective structure 11 may comprise at least one dielectric material, such as insert molding/nano injection molding plastics, ceramic materials, flexible materials, foams, polymers, and combinations.

As shown in FIGS. 6 to 8, at least one of the first reflective structure 7 and the second reflective structure 11 has a longitudinal extension L being of the same length as, or longer than, the longitudinal extension of the antenna element 4.

As shown in FIGS. 6*a* and 6*b*, at least one of the first reflective structure 7 and the second reflective structure 11 may have a transverse extension being of a height equal to the predetermined distance X.

At least one of the first reflective structure 7 and the second reflective structure 11 may comprise at least one groove 13, as shown in FIGS. 2, 4*a* to 4*d*, and 6, or at least one row 14 of protrusions 14*a*, as shown in FIGS. 5 and 6*b*. The longitudinal extension L of the groove 13 or row 14 of protrusions corresponds to the longitudinal extension of the antenna element 4.

Each groove 13 extends into a body of the second conductive element 3, as shown in FIGS. 2 and 4*a* to 4*d*, or into a body of the third conductive element 9. Each groove 13 may furthermore extend at an angle $\alpha>0°$ to the first conductive surface 3*a* of the second conductive element 3, to the second conductive surface 3*b* of the second conductive element 3, or to the first conductive surface 9*a* of the third conductive element 9.

Each groove 13 may comprise of a continuous recess, as shown in FIG. 6*a*, or of a plurality of individual cavities, the individual cavities being arranged in sequence in the direction of the longitudinal extension L of the groove 13. The continuous recess as well as the individual cavities may have any suitable shape such as that of a parallelepiped or a cylinder.

Each row 14 of protrusions 14*a* extends from the first conductive surface 3*a* of the second conductive element 3, the second conductive surface 3*b* of the second conductive element 3, or the first conductive surface 9*a* of the third conductive element 9. Each protrusion 14*a* extends into the interior of the first reflection passage 1 or the interior of the second reflection passage 8.

The row 14 of protrusions comprises at least one protrusion 14*a*, and each protrusion 14*a* may extend at, e.g., a 90° angle to the first conductive surface 3*a* of the second conductive element 3, to the second conductive surface 3*b* of the second conductive element 3, or to the first conductive surface 9*a* of the third conductive element 9. Each protrusion 14*a* of a row 14 of protrusions is arranged in sequence in the direction of the longitudinal extension L of the row of protrusions, as shown in FIG. 6*b*. The protrusions 14*a* may have any suitable shape such as that of a parallelepiped or a cylinder.

At least one of the first reflective structure 7 and the second reflective structure 8 may comprise a plurality of grooves 13 or a plurality of rows 14 of protrusions, each groove 13 or protrusion 14*a* of the first reflective structure 7 and the second reflective structure 11 having the same transverse extension. In one embodiment, at least two of the grooves 13 and the protrusions 14*a* comprises dielectric materials having different dielectric properties. Here, the transverse extension is constant height for the first reflective structure 7 and the second reflective structure 8, and variable electrical lengths for the reflective structures 7, 8 are achieved by the different dielectric properties. Such a first reflective structure 7 and second reflective structure 8 can be made extremely wideband or to cover multiple frequency bands.

In a further embodiment, each groove 13 or row 14 of protrusions comprising the same dielectric material, and at least two of the grooves 13 and the rows 14 of protrusions have different transverse extensions. When multiple transverse extensions, heights, are used, it is possible to obtain much wider operational bandwidth for the reflective structure 7, 11. The electrical properties of dielectric material, $\varepsilon_r$, will define the physical length of the groove 13, which can be estimated by using the following equation: Physical height$=c_0/\sqrt{f\varepsilon_r}$, where $c_0$ is the speed of light and f is frequency. The calculated physical height gives a proper height at one frequency. Typically, the desired operating range should be wide and may include, e.g., a frequency range from 26.5 GHz to 29.5 GHz. For example, if the reflective structure 7, 11 is designed to operate at low band (26.5-29.5 GHz), the height should be roughly between 1.7 and 2.1 mm if a substrate with $\varepsilon_r=2$ is used.

At least one of the first reflective structure 7 and the second reflective structure 11 may comprise a first reflective set 15 which comprises at least one groove 13 or at least one row 14 of protrusions. The longitudinal extension L1 of the first reflective set 15 is parallel with the longitudinal extension of the antenna element 4.

Figure 8A:
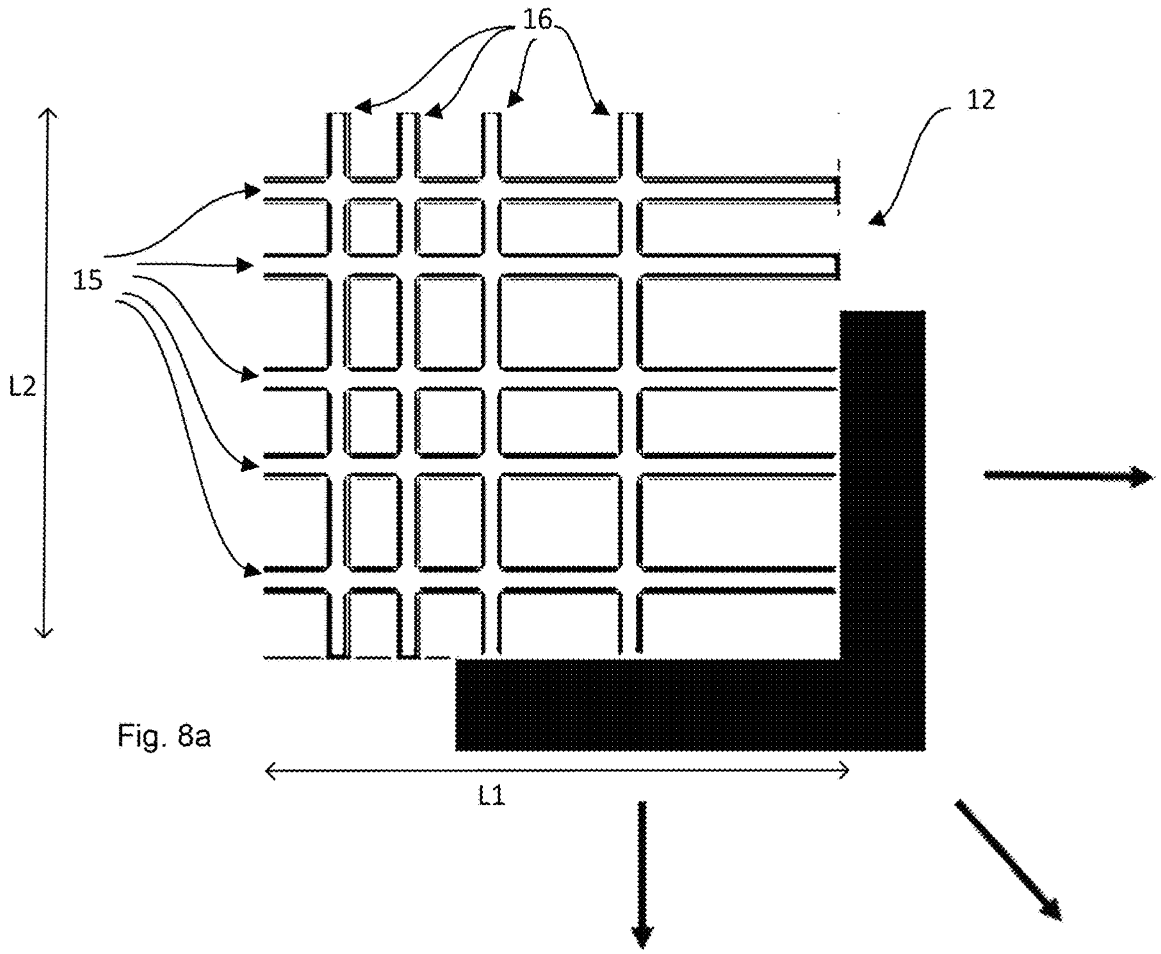
FIG. 8*a* shows a schematic top view of a redirecting structure in accordance with one embodiment of the present disclosure.
Figure 8B:
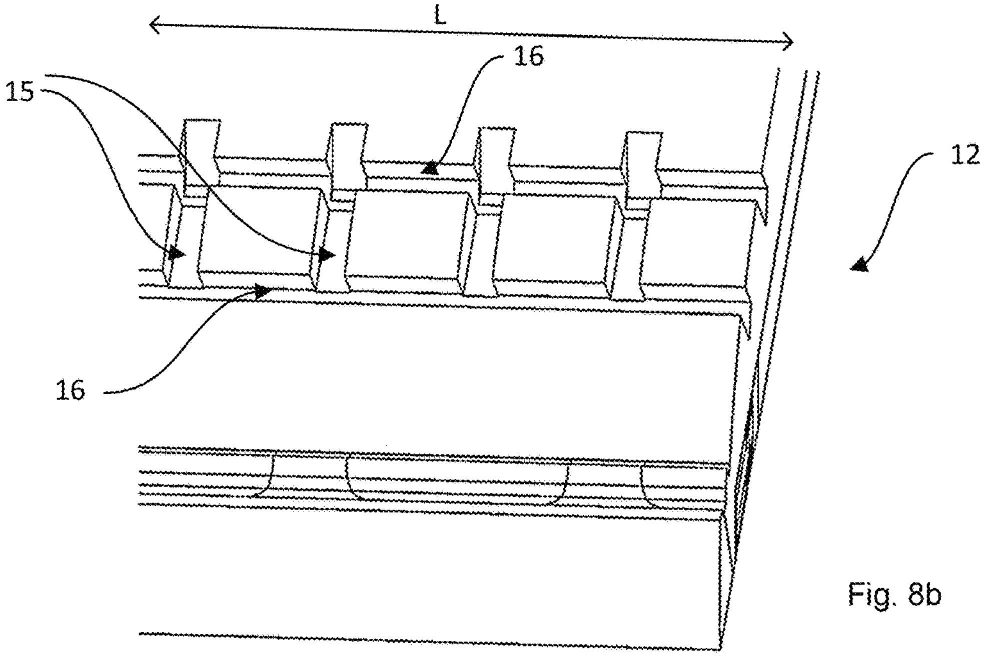
FIG. 8*b* shows a perspective view the embodiment shown in FIG. 8*a*.

As shown in FIGS. 8*a* and 8*b*, the redirecting structure 12 may comprise a first antenna structure and a second antenna structure. Antenna element 4 of the second antenna structure has a longitudinal extension which is perpendicular to a longitudinal extension of the antenna element 4 of the first antenna structure. At least one of the first reflective structure 7 and the second reflective structure 11 comprises a second reflective set 16 which comprises at least one groove 13 or at least one row 14 of protrusions. The longitudinal extension L2 of the second reflective set 16 is perpendicular to the longitudinal extension L1 of the first reflective set 15, such that a groove 13 or row 14 of protrusions of the first reflective set 15 intersects a groove 13 or row 14 of protrusions of the second reflective set 16. The first reflective set 15 extends in parallel with the longitudinal extension L of the first antenna structure, and the second reflective set 16 extends in parallel with the longitudinal extension L of the second antenna structure. The redirecting structure 12 comprises a matrix of grooves 13 and/or rows 14 of protrusions, which is preferable when the antenna aperture is not properly defined.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or operations, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

What is claimed is:

1. A redirecting structure for electromagnetic waves having a wavelength, comprising:

a first reflection passage formed between a first conductive surface of a first conductive element and a first conductive surface of a second conductive element;

at least one antenna structure comprising at least one antenna element and at least one radiation passage extending from the at least one antenna element in a first direction, wherein the at least one antenna structure is connected to the first reflection passage at a first interface, wherein the first reflection passage extends in a second direction, and wherein the second direction is different from the first direction; and a first reflective structure associated with an interior of the first reflection passage, wherein the first reflective structure is arranged at a predetermined distance from the first interface, and wherein the first reflective structure extends in parallel with a longitudinal extension of the at least one antenna element.

2. The redirecting structure according to claim 1, further comprising:

a second reflection passage formed between a second conductive surface of the second conductive element and a first conductive surface of a third conductive element, wherein the second reflection passage extends in a third direction, wherein the third direction is different from the first direction and the second direction, and wherein antenna structure comprises a second interface connecting the radiation passage to the second reflection passage.

3. The redirecting structure according to claim 2, further comprising:

a second reflective structure associated with an interior of the second reflection passage, wherein the second reflective structure is arranged at the predetermined distance from the second interface, and wherein the second reflective structure extends in parallel with the longitudinal extension of the at least one antenna element.

4. The redirecting structure according to claim 1, wherein the radiation passage extends from the at least one antenna element in a direction towards the first conductive element.

5. The redirecting structure according to claim 3, wherein the radiation passage extends from the at least one antenna element between a second conductive surface of the first conductive element and a second conductive surface of the second conductive element or between the second conductive surface of the first conductive element and the first conductive surface of the third conductive element.

6. The redirecting structure according to claim 3, wherein the first reflective structure is arranged at the first conductive surface of the second conductive element and/or the second reflective structure is arranged at the second conductive surface of the second conductive element or the first conductive surface of the third conductive element.

7. The redirecting structure according to claim 3, wherein at least one of the first reflective structure and the second reflective structure has a longitudinal extension being of the same length as, or longer than, the longitudinal extension of the at least one antenna element.

8. The redirecting structure according to claim 3, wherein at least one of the first reflective structure and the second reflective structure has a transverse extension being of a height equal to the predetermined distance.

9. The redirecting structure according to claim 3, wherein at least one of the first reflective structure and the second reflective structure comprises at least one groove or at least one row of protrusions extending from the first conductive surface of the second conductive element, the second conductive surface of the second conductive element, or the first conductive surface of the third conductive element, wherein each groove extends into a body of the second conductive element or the third conductive element, wherein each protrusion extends into the interior of the first reflection passage or the interior of the second reflection passage, and wherein the longitudinal extension of the groove or row of protrusions corresponds to the longitudinal extension of the at least one antenna element.

10. The redirecting structure according to claim 9, wherein the groove extends at an angle $(\alpha)>0°$ to the first conductive surface of the second conductive element, to the second conductive surface of the second conductive element, or to the first conductive surface of the third conductive element.

11. The redirecting structure according to claim 3, wherein at least one of the first reflective structure and the second reflective structure comprises at least one dielectric material.

12. The redirecting structure according to claim 9, wherein at least one of the first reflective structure and the second reflective structure comprises a plurality of grooves or a plurality of rows of protrusions, wherein each groove or protrusion of the first reflective structure and the second reflective structure have the same transverse extension, at least two of the grooves and the protrusions comprising dielectric materials having different dielectric properties.

13. The redirecting structure according to claim 9, wherein at least one of the first reflective structure and the second reflective structure comprises a plurality of grooves or a plurality of rows of protrusions, each groove or row of protrusions comprising the same dielectric material, at least two of the grooves and the rows of protrusions having different transverse extensions.

14. The redirecting structure according to claim 2, wherein at least one of the first reflection passage and the second reflection passage is filled with one of air, vacuum, and a foam material.

15. The redirecting structure according to claim 1, wherein the predetermined distance is quarter wavelength $(\lambda/4)\pm 25\%$.

16. An electronic device comprising a redirecting structure, a display and a frame comprising a main frame section, extending essentially in parallel with the display, and a peripheral frame section at least partially surrounding a peripheral edge of the display, the redirecting structure comprising:

a first reflection passage formed between a first conductive surface of a first conductive element and the first conductive surface of a second conductive element;

at least one antenna structure comprising at least one antenna element and at least one radiation passage extending from the at least one antenna element in a first direction, wherein the at least one antenna structure is connected to the first reflection passage at a first interface, wherein the first reflection passage extends in a second direction, and wherein the second direction is different from the first direction; and a first reflective structure associated with an interior of the first reflection passage, wherein the first reflective structure is arranged at a predetermined distance from the first interface, wherein the first reflective structure extends in parallel with a longitudinal extension of the at least one antenna element, and wherein the at least one antenna structure extends at least between the display and the peripheral frame section.

17. The electronic device according to claim 16, wherein the display is the first conductive element, wherein the main frame section is the second conductive element, and wherein the first reflection passage extends between the display and the main frame section, wherein the main frame section and the peripheral frame section are separated by at least one of a second reflection passage and the radiation passage of the at least one antenna structure.

18. The electronic device according to claim 17, wherein the peripheral frame section is a third conductive element surrounding the periphery of the display and the main frame section, wherein the second reflection passage extends between the main frame section and the peripheral frame section.

19. The electronic device according to claim 16, wherein the main frame section is the first conductive element, wherein the peripheral frame section is the second conductive element, and wherein the first reflection passage extends between the main frame section and the peripheral frame section, wherein the main frame section and the peripheral frame section are separated by the first reflection passage and the radiation passage of the at least one antenna structure.

20. The electronic device according to claim 16, wherein the first reflective structure is arranged at a first conductive surface of the main frame section and optionally a second reflective structure is arranged at a second conductive surface of the main frame section.

* * * * *